Patented Aug. 22, 1950

2,519,403

UNITED STATES PATENT OFFICE 2,519,403

SULFONYL DERIVATIVES OF DI-TERTIARY-ALKYL PEROXIDES AND A METHOD FOR THEIR PRODUCTION

Frederick F. Rust, Alan R. Stiles, and William E. Vaughan, Berkeley, Calif., assignors to Shell Development Company, San Francisco, Calif., a corporation of Delaware No Drawing. Application December 19, 1947, Serial No. 792,840

13 Claims. (Cl. 260—543)

This invention relates to novel sulfonyl derivatives of di-tertiary-alkyl peroxides and to a method for their production. More particularly the invention provides a new class of compounds which are the acid derivatives of novel organic sulfonic acids that are structural analogs of the alkanesulfonic acids.

The compounds provided by the invention are the acid derivatives of sulfonic acids which may be visualized as di-tertiary-alkyl peroxides in which at least one hydrogen atom has been replaced by a sulfonic acid group (–SO₃H). The term "acid derivative" is employed throughout the specification and the appended claims to designate compounds derivable from such sulfonic acids by replacing the hydroxyl group of the acid with a monovalent group formed by the removal of an active hydrogen atom from a hydrogen active molecule, or by replacing the polar hydrogen atom of the acid with a cation.

In recent years a class of organic compounds containing peroxide oxygen atoms (—O—O—) have found wide commercial application. Whereas the —S—S— linkage is very stable, the —O—O— linkage is very unstable and the principal uses of compounds containing it are in oxidation or reduction reactions or in reactions involving the rupture of the linkage resulting in the formation of free radicals. Such peroxides in which one of the free valences of the peroxide oxygen atoms is satisfied by an organic radical and the other is satisfied by a hydrogen atom have found many applications chemically analogous to those of hydrogen peroxide. An example is the use of perbenzoic acid, HO—O—COC₆H₅, as an oxidizing agent for reactions conducted in chloroform. The chemical analogy with hydrogen peroxide is similarly exhibited by compounds in which both free valences of the peroxide oxygen atoms are satisfied by organic radicals; for example, benzoyl peroxide,

C₆H₅CO—O—O—COC₆H₅ is used as a bleaching agent for flour. Similarly, such compounds in which each of the free valences of the peroxide oxygen atoms are satisfied by hydrocarbon radicals are known to behave both as oxidizing and reducing agents. Diethyl peroxide, for example, is known to undergo a rapid decomposition in the presence of ferrous ions to produce acetaldehyde and ethyl alcohol, and when certain oxidizable materials are co-present, the peroxide behaves as an active oxidizing agent.

The most commercially valuable use to which the organic peroxides have been adapted embodies their property of dissociating into active free radicals under the influence of heat or light. It is known that many chemical reactions of widely differing nature, particularly reactions involving polymerization and addition, proceed more rapidly and efficiently when conducted in the presence of a substance readily forming free radicals in the phase of the reaction medium containing the reactants. Dialkyl peroxides, because they are less apt to decompose violently upon impact and under the conditions of normal handling and storage, have proven to be of particular advantage for such applications.

Dialkyl peroxides, however, have a characteristic insolubility in the ordinary polar solvents, such as water, as compared to their high solubility in the non-polar organic solvents. Since it is highly advantageous to conduct numerous chemical reactions in a bi-phase reaction system composed of immiscible ionic and non-ionic solvents, as the emulsion polymerization reactions for example, it is accordingly advantageous to have available compounds exhibiting the free radical-forming and stability properties of the dialkyl peroxides, but exhibiting a greater solubility in the ionic solvents.

A principal object of the present invention is to provide a general method of synthesizing a novel class of organic compounds, the sulfonyl derivatives of di-tertiary-alkyl peroxides. Another object is to provide a class of compounds containing peroxide oxygen atoms and having the free-radical forming and the desirable stability characteristics of the di-tertiary-alkyl peroxides while in addition exhibiting a greatly increased solubility in a wide variety of polar solvents. Still other objects and advantages of the invention will be apparent from the following description.

As mentioned above, the organic peroxides are a highly reactive class of compounds readily entering into oxidation and reduction reactions in the presence of oxidizing or reducing agents. We have now discovered, however, that the di-tertiary-alkyl peroxides upon treatment with sulfur dioxide and gaseous chlorine or bromine in the presence of actinic light form sulfonyl derivatives, e. g., sulfonyl chlorides or bromides in the presence of the strong oxidizing and reducing agents, chlorine or bromine and sulfur dioxide, respectively, without oxidation or reduction of the organic peroxide. This surprising discovery that a sulfonyl halide group, —SO₂—(halogen), can be caused to replace a hydrogen atom of the highly reactive di-tertiary alkyl peroxides has provided a novel method for the preparation of a new class of peroxidic compounds in which any one of a wide variety of polar ionic solvent-solubilizing groups are attached to the molecule of a di-tertiary-alkyl peroxide through a sulfonyl group.

Substantially any di-tertiary-alkyl peroxide, i. e., a peroxide in which each free valence of the peroxide oxygen atoms is satisfied by a carbon atom (of an alkanyl radical) which is directly attached to three other carbon atoms may be employed as a starting compound. It is preferable to employ such peroxides containing a plurality of alpha methyl groups and containing not more than about 12 carbon atoms, particularly the di-tertiary-butyl peroxides and their bromo or chloro derivatives. The Vaughan and Rust Patent U. S. 2,395,523, issued February 26, 1946, describes and claims such peroxides and a process for their preparation by the controlled oxidation of branched chain hydrocarbons, and the copending patent application No. 649,116, filed February 20, 1946, now abandoned, describes and claims similar peroxides containing at least one halo substituent. The di-tertiary-alkyl peroxides prepared by the processes of the above patent and patent application or by still other methods, in which at least one carbon atom bears a hydrogen atom, may be suitably employed in the present process. Examples of such suitable peroxides include, di-tertiary-butyl; di-tertiary-amyl; tertiary-butyl tertiary-amyl; chloro-di-tertiary-butyl; tertiary-butyl beta,beta-dibromo-tertiary-amyl; di-tertiary-hexyl; tertiary-hexyl tertiary-heptyl; di-tertiary-heptyl; di-tertiary-octyl; di-tertiary-nonyl; and the like peroxides.

The sulfo halogenation of di-tertiary-alkyl peroxides leads to the formation of sulfonyl halides having, in addition to the chemical properties of the di-tertiary-alkyl peroxides, the chemical properties of the organic sulfonyl halides. While valuable and stable compounds themselves, such sulfonyl halides are particularly valuable intermediates in the preparation of derivatives in which the halogen atom has been replaced by another monovalent group.

A particularly convenient, therefore preferred, preparation of the sulfonyl derivatives of di-tertiary-alkyl peroxides thus comprises the conversion of a di-tertiary-alkyl-peroxide to a sulfonyl chloride and its conversion to the desired derivative by a reaction with a hydrogen active compound in a manner analogous to that employed for the same reaction of an alkanesulfonyl halide. We have found that the sulfonyl halides of di-tertiary-alkyl peroxides may be reacted with hydrogen active compounds including ammonia, amines containing at least one amino hydrogen atom, water, alcohols, acids, and even organic hydroperoxides without rupture of the peroxide oxygen linkage. The —O—O— linkage heretofore considered extremely reactive under conditions conducive to oxidation or reduction being unaffected by the presence of metallic ions in the same media, or in the presence of a strong oxidizing agent such as an organic hydroperoxide.

The initial step in the preparation of the compounds of the invention, the treatment of the di-tertiary-alkyl peroxide with sulfur dioxide and halogen may be conducted in the vapor or liquid phase. As the peroxides are comparatively nonvolatile and require the employment of relatively low pressures for a vapor-phase reaction at the most desirable temperatures, it is generally more convenient and economical to conduct the reaction in the liquid phase under substantially atmospheric pressure.

In most cases it is convenient to conduct the reaction by the direct addition of the gaseous reactants to a liquid peroxide. However, where the particular peroxide to be employed is a solid, or where it is desirable for other reasons, the peroxide may be diluted with or suspended in an inert solvent. Carbon tetrachloride, chloroform, as well as similar polyhalogenated hydrocarbon solvents may suitably be employed as inert solvents.

The sulfohalogenation reaction is preferably conducted in the presence of actinic light radiations and moderately low reaction temperatures are preferable. In general, reaction temperatures of more than about 50° C. rapidly increase the occurrence of side reactions with a corresponding decrease in the yield of the desired products. Decreasing the reaction temperature produces a corresponding decrease in the rate of reaction which, though it may to a certain extent be avoided by the employment of a stronger source of light radiation, becomes disadvantageous at below about −25° C. It has been found particularly suitable to employ reaction temperatures within the range of about 0° C. to about 20° C.

As a source of actinic light radiations, sunlight either natural or artificial, incandescent, fluorescent or ultra-violet light sources may be employed. As the primary purpose of the actinic light appears to be to cause the dissociation of the gaseous chlorine, the reaction vessels employed may be constructed of or provided with windows of substantially any transparent material and only slightly more rapid reactions with the same light source usually results from the use of vessels, such as quartz, transmitting larger proportions of the lower wave length radiations.

It has been found preferable to maintain an excess of the peroxides over the sulfur dioxide and halogen introduced throughout the course of the reaction. When the molar proportions of the reactants combined in absence of an inert diluent are allowed to reach a 1:1:1 molar ratio there is a tendency toward the formation of explosively unstable side reaction products. In general, the maintenance of at least a 2:1:1 molar excess of undiluted peroxide to the gaseous reactants is preferred. Where it is desired to introduce a plurality of sulfohalo groups, it is therefore preferable to treat the peroxide dissolved in an inert solvent with an excess of sulfur dioxide and halogen.

The molar ratio of the gaseous reactants introduced is not critical and may be varied over a wide range, but it is preferable to employ a molar excess of the sulfur dioxide over halogen to prevent an excess of halogenation over sulfohalogenation.

While the present invention is not dependent upon a particular mode of interaction between the reactants, it is believed that the following equations represent the mechanism of the sulfohalogenation reaction and illustrate certain features of the invention:

1. The halogen molecules, X—X, are activated by actinic light and dissociate into free halogen atoms,

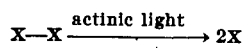

2. The free halogen atoms remove a hydrogen atom from the di-tertiary-alkyl peroxide molecule, represented by $(C_nH_{2n+1})$—O—O—$(C_nH_{2n+1})$, to form a molecule of hydrogen halide and a free radical, represented by $$(C_nH_{2n+1})-O-O-(C_nH_{2n})$$
$$X+(C_nH_{2n+1})-O-O-(C_nH_{2n+1}) \rightarrow$$
$$HX+(C_nH_{2n+1})-O-O-(C_nH_{2n})$$

3. The peroxide-oxygen containing free radical so formed then adds a molecule of sulfur dioxide forming a larger free radical, $$(C_nH_{2n+1})-O-O-(C_nH_{2n})+SO_2 \rightarrow$$
$$(C_nH_{2n+1})-O-O-(C_nH_{2n})-SO_2$$

4. The free radical addition product so formed extracts a halogen atom from a molecule of halogen to saturate itself and propagate the chain reaction by releasing an additional free halogen atom, $$(C_nH_{2n+1})-O-O-(C_nH_{2n})-SO_2+X-X \rightarrow$$
$$(C_nH_{2n+1})-O-O-(C_nH_{2n})-SO_2-X+X$$

The importance of an excess of sulfur dioxide over halogen thus becomes readily apparent since the free radical produced in Equation 2 could also saturate itself by reacting with a molecule of halogen to form a halo derivative of the peroxide.

The above probable reaction mechanism would seem to explain a further observed fact. While in many sulfohalogenation reactions bromine may be considered the equivalent of chlorine, in the present process, the use of bromine with the particularly preferred starting compounds, i. e. the di-tertiary-butyl peroxides and their chloro or bromo derivatives of the defined structure, appears to require generally more strenuous reaction conditions. As it will be seen in Equation 2, a step in the reaction chain is the removal of a hydrogen atom from a di-tertiary alkyl peroxide molecule in the form of a hydrogen halide. In view of the difference in their heats of formation it would appear that the energy involved in forming hydrogen bromide is not sufficiently like that involved in the formation of hydrogen chloride for bromine to be an equivalent of chlorine where this step must be accomplished by the removal of a primary hydrogen atom from an alpha position. However, in many applications of the present process, for example, where radicals larger than tertiary-butyl radicals are attached to the peroxide oxygen atoms, or the characteristics of the peroxide employed will allow the use of greater than the preferred range of temperatures (from 0° C. to 20° C.) bromine may suitably be employed.

The following examples describe in detail various preferred methods of accomplishing the invention as applied to individual compounds. The invention is, however, not limited to the use of the particular reactants and reaction conditions recited in the examples.

THE PREPARATION OF SULFONYL HALIDES OF DI-TERTIARY-ALKYL PEROXIDES

Example I

A transparent reaction vessel containing 1 mole (146 g.) of di-tertiary-butyl peroxide was illuminated by a 500 watt lamp. While the peroxide was maintained, by external cooling, at between 6° C. and 8° C., 0.3 mole of sulfur dioxide and 0.2 mole of chlorine were introduced. The chlorine and sulfur dioxide were introduced as a gaseous mixture in 3:2 molar proportions through a sintered glass plate immersed in the liquid peroxide. The introduction was completed in a period of about one and one-half hours. The reaction products were then subjected to a low pressure distillation and the volatile components including hydrogen chloride, sulfur dioxide and unreacted di-tertiary-butyl peroxide were removed. A light yellow liquid remained, which, upon vacuum distillation at a pressure of less than 1 mm., was found to be a water-white liquid boiling from 72–77° C. The following analysis identified the reaction product as 2-tertiary-butylperoxy-2-methylpropanesulfonyl chloride, $$\begin{array}{ccc} CH_3 & & CH_3 \\ | & & | \\ CH_3-C-O-O-C-CH_2-SO_2Cl \\ | & & | \\ CH_3 & & CH_3 \end{array}$$

|  | Found | Theory for $C_8H_{17}O_4SCl$ |
|---|---|---|
| Percent Carbon | 38.7 | 39.3 |
| Percent Hydrogen | 7.0, 7.1 | 7.0 |
| Percent Sulfur | 13.2 | 13.1 |
| Percent Chlorine | 15.6, 15.8 | 14.5 |
| $n_D^{20}$ | 1.4157 |  |
| M. P. °C. | 20–25 |  |

Example II

By placing 2-tertiary-butylperoxy-2-methylhexane in a similar reactor, maintaining it at a temperature of below about 50° C. in the presence of actinic light and introducing gaseous sulfur dioxide and bromine in molar proportions of substantially 3:2 until the peroxide, sulfur dioxide, and bromine, respectively, have been combined in molar proportions of about 10:3:2 a sulfobromination product will be produced which has the formula $C_{11}H_{23}O_4SBr$.

Example III

A solution of 0.3 mole of di-tertiary-hexyl peroxide in carbon tetrachloride maintained at below room temperature in the presence of actinic light during the introduction of 0.8 mole of sulfur dioxide and 0.7 mole of chlorine in the manner described in Example I will contain a sulfochloride of the formula $C_{12}H_{25}(SO_2Cl)n$ where $n$ is an integer greater than one.

Where, as in this case, the peroxide employed has a molecular weight sufficiently high as to render the separation of the reaction products by distilling off the peroxide somewhat difficult, the reactants may readily be separated by chemical means, for example, by selective solvation, hydration and salt formation or the like processes.

Example IV

By treating bromo-di-tertiary-butyl peroxide with sulfur dioxide and chlorine at a temperature below about 20° C. in the presence of actinic light in the manner described in Example I substantial amounts of a sulfochloride of the formula $$C_8H_{16}O_4SClBr$$

will be obtained.

THE PREPARATION OF METAL SALTS OF SULFONIC ACIDS OF DI-TERTIARY-ALKYL PEROXIDES

Example V

Di-tertiary-butyl peroxide was treated with sulfur dioxide and chlorine in the proportions and under the same reaction conditions described in Example I. When the introduction of gas was completed the reaction products were treated with a portion of a 20–30% aqueous potassium hydroxide solution, resulting in the formation of plate-like white crystals. The crystals were removed from the mixture by filtration, dried and analyzed as follows:

|  | Found | Theory for $C_8H_{17}O_5SK$ |
|---|---|---|
| Percent Carbon | 35.8, 36.0 | 36.4 |
| Percent Hydrogen | 6.7, 6.8 | 6.4 |
| Percent Sulphur | 11.9 | 12.1 |
| Percent Potassium | 14.8, 14.9 | 14.8 |

The reaction product, potassium 2-tertiary-butylperoxy-2-methylpropanesulfonate

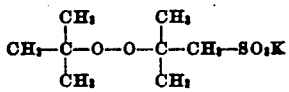

was tested for stability by placing it on a metal plate and striking it with a hammer. The dry salt did not detonate under the impact which was sufficient to cause a sharp explosion from a peroxide salt such as potassium perbenzoate.

Example VI

The salts of polyvalent metals are prepared in an analogous manner. The treatment of the crude 2-tertiary-butylperoxy-2-methylpropane-sulfonyl chloride prepared as described in Example I with an excess of calcium hydroxide produces salts of the formula $C_8H_{16}O_5SCa$ and $(C_8H_{17}O_5S)_2Ca$.

THE PREPARATION OF SULFONIC ACIDS OF DI-TERTIARY-ALKYL PEROXIDES

Example VII

Di-tertiary-butyl peroxide was treated with sulfur dioxide and chlorine in the proportions and under the same reactions described in Example I. When the introduction of gas was completed, the reaction products were treated with a portion of a 20-30% aqueous potassium hydroxide solution, resulting in the formation of plate-like white crystals. The crystals were removed from the mixture by filtration, dissolved in water and treated with a slight excess of hydrochloric acid. On cooling the solution 2-tertiary-butyl-peroxy-2-methylpropanesulfonic acid having the formula,

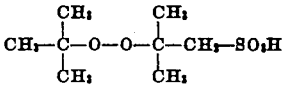

was precipitated in the form of white crystals.

Example VIII

Upon the addition of water to the reaction mixture obtained by the sulfobromination of 2-tertiary-butylperoxy-2-methylhexane as described in Example II the crude sulfobromide will be directly hydrolyzed to a sulfonic acid of the formula $C_{11}H_{24}O_5S$ and separated from the reaction mixture by the extraction of the non-polar components with ether.

The foregoing and related peroxysulfonic acids and their salts, and methods for their production, are disclosed and claimed in copending application Serial No. 77,692, filed February 21, 1949.

THE PREPARATION OF SULFONAMINO DERIVATIVES OF DI-TERTIARY-ALKYL PEROXIDES

Example IX

Di-tertiary-butyl peroxide, sulfur dioxide and chlorine were combined and allowed to react in the manner described in Example I. The volatile components of the reaction were removed by a low pressure distillation and the residue at a temperature of about 70° C. was treated with about an equivalent amount of aniline. The addition of aniline resulted in the immediate formation of a crystalline precipitate. The precipitate, 2-tertiary - butylperoxy - 2 - methylpropanesulfonanilide,

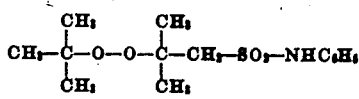

was filtered, washed, dried and found to have a melting point of 91.6-92.4° C.

Example X

A crude sulfochlorination reaction product obtained by treating di-tertiary-butyl peroxide by the process of Example I when poured into a mixture of concentrated ammonium hydroxide and ice, produces a white amorphous solid precipitate of 2-tertiary-butylperoxy-2 - methylpropanesulfonamide,

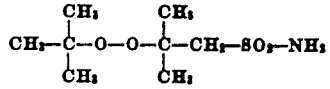

Example XI

A crude sulfochlorination reaction product obtained by treating di-tertiary-butyl peroxide in the manner described in Example I when shaken with an excess of aqueous sodium hydroxide containing a molar excess of di-normal-butylamine the resulting product will be n,n-dibutyl 2-tertiary - butylperoxy - 2 - methylpropanesulfonamide.

The novel tertiary peroxy sulfonamino derivatives, of which the foregoing are examples, are described and claimed, together with the method of their production, in copending application Serial No. 76,406, filed February 14, 1949.

THE PREPARATION OF PERSULFONIC ESTERS OF DI-TERTIARY-ALKYL PEROXIDES

Example XII

Di-tertiary-butyl peroxide was sulfochlorinated as described in Example I. The reaction product after the removal of the volatile components, in the amount of 5 grams was added in 20 moles of ether to a slurry of 5 grams of sodium tertiary-butyl peroxide in 50 moles of ether. The temperature of both peroxide-ether mixtures was maintained at 10° C. during the mixing of the reagents and for an additional hour. At the end of this time the ether solution of the reactants was extracted with water, dried and the ether removed by distillation. A liquid residue of two grams, corresponding to a yield of 33% of a new peroxide remained. The following analysis indicates the structure of the new peroxide to be tertiary-butyl 2-tertiary - butylperoxy-2-methylpropane-persulfonate,

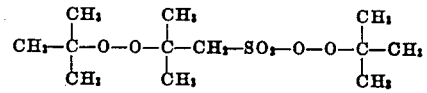

|  | Found | Theory for $C_{12}H_{26}O_6S$ |
|---|---|---|
| Percent Carbon | 48.0, 48.2 | 48.4 |
| Percent Hydrogen | 8.9, 8.8 | 8.7 |
| Percent Sulfur | 9.6, 9.5 | 10.7 |
| $n_D^{20}$ | 1.4350 |  |

This and other new persulfonic esters and methods for their production are disclosed and claimed in copending application Serial No. 77,693, filed February 21, 1949.

The invention claimed is:

1. The compound, 2-tertiary-butylperoxy-2-methylpropanesulfonyl chloride.

2. A process for the preparation of 2-tertiary-butylperoxy-2-methylpropanesulfonyl chloride which comprises the reaction of di-tertiary-butyl peroxide with gaseous sulfur dioxide and chlorine in molar proportions predominating in sulfur dioxide at a temperature between −25° C. and 50° C. in the presence of actinic light.

3. A process for the sulfochlorination of an organic peroxide, which comprises, contacting a di-tertiary-alkyl peroxide, maintained at a temperature below a temperature at which a substantial decomposition of the peroxide occurs, in the liquid phase and in the presence of actinic radiations, with a mixture of chlorine and sulfur dioxide predominating in sulfur dioxide.

4. A process for the sulfochlorination of an organic peroxide, which comprises, contacting a chloro-substituted di-tertiary-alkyl peroxide in which at least one carbon atom bears a hydrogen atom, maintained at a temperature below a temperature at which a substantial decomposition of the peroxide occurs, in the liquid phase and in the presence of actinic radiations, with a mixture of chlorine and sulfur dioxide predominating in sulfur dioxide.

5. A process for the sulfohalogenation of an organic peroxide, which comprises, contacting a chloro-substituted di-tertiary-alkyl peroxide in which at least one carbon atom bears a hydrogen atom, maintained at a temperature below a temperature at which a substantial decomposition of the peroxide occurs, in the liquid phase and in the presence of actinic radiations, with a mixture of sulfur dioxide and a halogen of the group consisting of chlorine and bromine.

6. A process for the sulfohalogenation of an organic peroxide, which comprises, contacting a peroxide of the group consisting of the di-tertiary-alkyl peroxides and the halo-substituted di-tertiary-alkyl peroxides in which at least one carbon atom bears a hydrogen atom and the halo substituents are of the group consisting of chlorine and bromine, maintained at a temperature below a temperature at which a substantial decomposition of the peroxide occurs, in the liquid phase and in the presence of actinic radiations, with a mixture of sulfur dioxide and a halogen of the group consisting of chlorine and bromine.

7. A monosubstituted di-tertiary-alkyl peroxide in which the substituent group is a —$SO_2Cl$ group.

8. A di-tertiary-alkyl peroxide in which at least one hydrogen atom is replaced by a $SO_2Cl$ group.

9. A di-tertiary-alkyl peroxide in which at least one hydrogen atom is replaced by a $SO_2Cl$ group and at least one but not more than two hydrogen atoms have been replaced by a chlorine atom.

10. A di-tertiary-alkyl peroxide in which at least one hydrogen atom is replaced by a member of the group consisting of X and $SO_2X$, where X is a member of the group consisting of the bromine and chlorine atom, and at least one $SO_2X$ group is present in the molecule but not more than two halogen atoms attached to carbon atoms are present therein.

11. A process for sulfohalogenation according to claim 6 wherein a molar excess of said peroxide over the sulfur dioxide and said halogen is maintained in the reaction.

12. A process for sulfohalogenation according to claim 6 wherein the reaction is carried out in the presence of an inert diluent.

13. A process for sulfohalogenation according to claim 6 wherein a solution of said peroxide in an inert solvent is treated with an excess of sulfur dioxide and said halogen.

FREDERICK F. RUST.
ALAN R. STILES.
WILLIAM E. VAUGHAN.

REFERENCES CITED

The following references are of record in the file of this patent:

UNITED STATES PATENTS

| Number | Name | Date |
|---|---|---|
| 2,174,508 | Fox | Sept. 26, 1939 |
| 2,193,824 | Lockwood et al. | Mar. 19, 1940 |
| 2,333,788 | Holbrook et al. | Nov. 9, 1943 |